US008473576B2

(12) United States Patent
Philipeit (10) Patent No.: US 8,473,576 B2
(45) Date of Patent: Jun. 25, 2013

(54) COMMUNICATION SYSTEM FOR PROCESS-ORIENTED ACQUISITION, STORAGE, TRANSMISSION, AND PROVISION OF DATA

(75) Inventor: Rudolf Philipeit, Ansbach (DE)

(73) Assignee: Deutsche Telekom AG, Bonn (DE)

( * ) Notice: Subject to any disclaimer, the term of this patent is extended or adjusted under 35 U.S.C. 154(b) by 417 days.

(21) Appl. No.: 12/879,520

(22) Filed: Sep. 10, 2010

(65) Prior Publication Data

US 2011/0213857 A1     Sep. 1, 2011

(30) Foreign Application Priority Data

Mar. 1, 2010   (DE) .......................... 10 2010 009 755

(51) Int. Cl.
*G06F 15/16* (2006.01)
(52) U.S. Cl.
USPC ........... 709/217; 709/201; 709/203; 709/220; 709/222; 709/248
(58) Field of Classification Search
USPC .................. 709/201, 203, 217, 220, 222, 248
See application file for complete search history.

(56) References Cited

U.S. PATENT DOCUMENTS

| 6,031,354 | A | * | 2/2000 | Wiley et al. ................... 320/116 |
| 7,881,661 | B2 | * | 2/2011 | Mohammadioun et al. . 455/12.1 |
| 7,934,035 | B2 | * | 4/2011 | Miloushev et al. ........... 710/244 |
| 2002/0049749 | A1 | * | 4/2002 | Helgeson et al. ................. 707/3 |
| 2002/0194207 | A1 | * | 12/2002 | Bartlett et al. ................ 707/203 |
| 2003/0055811 | A1 | | 3/2003 | Stork et al. |
| 2005/0050148 | A1 | * | 3/2005 | Mohammadioun et al. .. 709/206 |
| 2010/0132023 | A1 | * | 5/2010 | Reese et al. ....................... 726/7 |

FOREIGN PATENT DOCUMENTS

WO     WO 2006084620 A1     8/2006

OTHER PUBLICATIONS

Jianrui Wang et al: "A Framework for Document-Driven Workflow Systems", Jan. 1, 2005, Business Process Management Lecture Notes in Computer Science, LNCS, Springer, Berlin, DE, XP019017196, ISBN: 978-3-540-28238-9, pp. 285-301.
Mohammad Ashiqur Rahaman et al: "Document-Based Dynamic Workflows: Towards Flexible and Stateful Services", Services-11, 2009. Services-2 '09. World Conference on, Sep. 21, 2009, pp. 87-94, XP031557666, IEEE, Piscataway, NJ, USA ISBN: 978-1-4244-5303-0.
Jaeho Kim et al: "Document-based workflow modeling: a case-based reasoning approach", Expert Systems With Applications, Bd. 23, Nr. 2, Aug. 2002, pp. 77-93, XP002648290, Elsevier UK ISSN: 0957-4174.
European Patent Office, International Search Report in International Patent Application No. PCT/DE2011/000156 (Aug. 29, 2011).

* cited by examiner

*Primary Examiner* — Liangche A Wang
(74) *Attorney, Agent, or Firm* — Leydig, Voit & Mayer, Ltd.

(57) ABSTRACT

A communication system for process-oriented acquisition, storage, transmission, and provision of data includes at least one server device and a plurality of data processing devices connected through a communication network. The at least one server device is configured to provide a predefined data container for at least one process. At least one of the plurality of data processing devices is configured to download the data container so as to perform a first process step of the at least one process and to provide at least a one-time initiation of the at least one process. The data container includes at least a module configured to automatically check for the presence of the at least one additional process step in the at least one process by evaluating the directory with the at least one additional process step.

20 Claims, 2 Drawing Sheets

COMMUNICATION SYSTEM FOR PROCESS-ORIENTED ACQUISITION, STORAGE, TRANSMISSION, AND PROVISION OF DATA

CROSS-REFERENCE TO PRIOR APPLICATIONS

This application claims benefit to German Patent Application No. DE 10 2010 009 755.1, filed on Mar. 1, 2010, which is hereby incorporated by reference herein in its entirety.

FIELD

The present invention concerns a communication system for process-oriented acquisition, storage, transmission, and provision of data.

BACKGROUND

Today, business and administrative processes no longer take place solely within one organization, which is to say within one company or one government agency for example, but rather across organizational boundaries, indeed, often across multiple organizational boundaries, so that at least some of the individual process participants who are responsible for carrying out the individual process steps also belong to different organizations.

Most private and public organizations today employ electronic communication systems and data processing systems for carrying out their business or administrative processes. In addition, process control systems such as so-called workflow management systems (WFMS) are already in use today in some organizations for automating business and administrative processes.

However, it is only rarely the case that all organizations or process participants involved in a business or administrative process, hereinafter also simply called process for short, use the same communication systems, data processing systems, and/or process control systems. It is far more likely that several process participants or participating organizations all work with different systems.

Particularly the data processing and process control systems, which are often tailored to specific requirements, or are even specially developed for them, and whose "influence" generally extends only to the borders of a particular organization, tend to have an insular character. This means that they do not, or at least do not easily, support data exchange, especially automated data exchange, with the various systems of other process participants.

Moreover, it is by no means the case that every organization possesses a process control system. Nor would the procurement of such a system be economically feasible, especially when processes are executed in small numbers or quantities.

Consequently, process-oriented data exchange between multiple process participants belonging to different organizations, and comprehensive monitoring and control of such processes, pose significant problems.

SUMMARY

In an embodiment, the present invention provides communication system is provided for process-oriented acquisition, storage, transmission, and provision of data. The communication system comprises at least one server device and a plurality of data processing devices connected through a communication network. The at least one server device is configured to provide a predefined data container for at least one process. At least one of the plurality of data processing devices is configured to download the data container so as to perform a first process step of the at least one process and to provide at least a one-time initiation of the at least one process. The data container comprises a number of data fields for acquisition, storage, and provision of process data of the at least one process, and a directory with at least one additional process step of the at least one process. The at least one additional process step is associated with addressing data of a respective responsible process participant responsible for the at least one additional process step. The data container comprises at least a module configured to: at the end of each step of the at least one process, automatically check, by evaluating the directory, for a presence of the at least one additional process step in the at least one process; when the at least one additional process step is present in the at least one process, determine the addressing data of the respective process participant responsible for the at least one additional process step; and transmit the data container to an additional data processing device of the respective process participant responsible for the at least one additional process step.

BRIEF DESCRIPTION OF THE DRAWINGS

The invention is further described in more detail with reference to an exemplary embodiment depicted in the following drawings, in which.

DETAILED DESCRIPTION

In one embodiment of the invention, a method is provided for making process-oriented data exchange possible in a simple and maximally cost-effective manner, even across the boundaries of multiple organizations and their insular solutions.

In another embodiment, the invention provides a method for the monitoring and control of these business or administrative processes so as to also be made possible in a simple and maximally cost-effective manner.

According thereto, a communication system for the process-oriented acquisition, storage, transmission, and provision of data is provided, which includes at least one server device, and a first and at least one additional data processing device, which are connected to one another through a communication network.

In this embodiment, the server device is designed according to the invention to provide a predefined data container for at least one business or administrative process, and specifically in such a manner that the data container can be downloaded through the communication network to the first data processing device, this being the data processing device of the process participant responsible for the first process step of the business or administrative process, and can be used for the at least one-time initiation of the process.

According to the invention, the data container is predefined in such a manner that it has a number of data fields for the structured acquisition, storage and provision of the process data required for the business or administrative process, and also has a directory with at least one additional process step belonging to the business or administrative process, with which is associated addressing data of a process participant responsible for this process step. Furthermore, the data container includes modules that, at the end of every process step, automatically bring about, by evaluation of the directory with the at least one additional process step, checking for the presence of an additional process step in the sequence of the business or administrative process, and which then, if such an additional process step is present, bring about the ascertainment of the addressing data of the process participant responsible for this additional process step and, using the ascertained addressing data, bring about the transmission of the data container, including the process data hitherto acquired and stored, to the additional data processing device of the process participant responsible for the additional process step.

In other words, the data container is provided by the server device, and is downloaded from there to the first data processing device of the first process participant through the communication network. The data container can then be opened on the first data processing device by the first process participant in order to initiate the process and in order to enter data in a number of data fields and store the data in the data container. At the end of the first process step, the modules associated with the data container automatically evaluate the directory with the at least one additional process step, and check for the presence of an additional process step in the sequence of the business or administrative process. In addition, in the event that such an additional process step is present, the modules automatically ascertain the addressing data of the process participant responsible for this additional process step, and, using the ascertained addressing data, transmit the data container, including the process data hitherto acquired and stored, to the additional data processing device of the process participant responsible for the additional process step.

It must be noted here that the communication network may also comprise multiple networks, partial networks and/or subnetworks of the same or different types (for example, Internet, intranet, WAN, LAN, cable-based networks, radio-based networks, IP-based networks), that the addressing data are, in particular, e-mail addresses or web service addresses, and that the modules referred to, which the at least one data container is designed with, comprise, in particular, program codes contained in the data container that can be executed on essentially any data processing device of any desired type after downloading and opening of the data container, and that brings about the described functions upon its execution. Thus, the downloaded data container inherently brings with it the requisite modules, in particular computer programs, but also a directory of the process steps belonging to the process.

If the addressing data of an additional process participant is an e-mail address, for example, then at the end of a process step the modules included in the data container automatically bring about the transmission of the data container as an attachment to an e-mail to the corresponding e-mail address. After receiving the e-mail, the additional process participant can open the attached data container again, whereupon the process data already contained in the data fields are available in electronic and structured form for carrying out the additional process step.

Thus, a service for the process-oriented acquisition, storage, transmission, and provision of data by means of an intelligent data container is provided by the at least one server device of the inventive communication system. This intelligent data container is distinguished, in particular, by structured and decentralized data management adapted to the particular business or administrative process, and a likewise decentralized process control proceeding from the data container itself, which hereinafter is also referred to as process-dependent routing. For each additional process, an additional data container developed or adapted for this process can be provided through the at least one server device.

For example, it is possible for companies or government agencies to provide, on their websites, web links for their customers or citizens to the relevant data containers on the at least one server device, through which the customers or citizens can download the corresponding data containers to their data processing devices, generally PCs or laptop computers, in order to then trigger the process as the first process participant in each case and to place an order with a company or submit an application to an agency by electronic devices, for example.

Hence, it can also be considered an advantage that the at least one server device included in the inventive communication system, which device is designed to provide at least one intelligent data container that is adapted for a specific business or administrative process, does not need to be maintained or operated by an organization that itself participates in the process. Rather, it is possible and provision is preferably made that a service provider that is not involved per se in the particular process operates the at least one server device that provides the process participants in the particular processes with an appropriately adapted data container.

Thus, provision is advantageously made in the communication system that the at least one data container provided by the at least one server device is predefined such that the at least one and each additional process step is assigned a position in the sequence of the business or administrative process so that a sequence of the process steps is defined, and wherein the data container is further designed with modules which, at the end of every process step, automatically bring about, by evaluation of the directory with the at least one additional process step, the ascertainment of the addressing data of the process participant responsible for the process step in the next position in the sequence of the business or administrative process, and which then bring about the transmission of the data container, including the process data hitherto acquired and stored, to the additional data processing device of the process participant responsible for the process step in the next position in the sequence of the business or administrative process.

In other words, at the end of the first process step, the modules with which the data container is designed automatically evaluate the directory with the at least one additional process step and ascertain the addressing data of the process participant responsible for the process step in the next position in the sequence of the business or administrative process. Then the data container, including the process data hitherto acquired and stored, is automatically transmitted to the additional data processing device of the process participant responsible for the process step in the next position in the sequence of the business or administrative process.

Hence the capability of the intelligent data container for decentralized process control or for process-dependent routing is also provided, in particular, when there is more than just one additional process step in the sequence of the business or administrative process.

In the communication system, the at least one data container provided by the at least one server device is preferably designed with modules that automatically bring about, after the first process participant has opened the data container for the thusly initiated business or administrative process, the generation of a new instance of the data container which has all the features of the downloaded data container, and that additionally cause a unique identifier to be fetched for this data container instance from the at least one server device, or another server device, and also, at the end of the process step, bring about the transmission to the additional data processing device of the generated data container instance, including the process data hitherto acquired and stored.

Consequently, after the data container has been opened by the first process participant, a new instance of the data container which has all the features of the downloaded data container is automatically generated for the thusly initiated business or administrative process by the modules with which the data container is designed, and moreover, a unique identifier is automatically fetched for this data container instance from the at least one server device, or another server device, via a suitable query, in particular a web service query, and at the end of the process step, the generated data container instance, including the process data hitherto acquired and stored, is automatically transmitted to the additional data processing device.

The unique identifier is, in particular, a character combination that permits or ensures unique identifiability of the data container instance. Since the data container instance keeps its unique identifier throughout the entire process sequence, the unique identifier can simultaneously serve to identify this process sequence as well. The at least one server device, or another server device, of the communication system is accordingly designed with modules, in particular computer program codes, that bring about the generation and transmission of a unique identifier for a data container instance to the first data processing device in response to a suitable query.

According to this embodiment, the data container downloaded from the server device remains on the data processing device of the first process participant, and thus can be used at a later time to reinitiate the business or administrative process by being reopened. This results in the advantage that the data container no longer has to be downloaded again from the server device by the first process participant in order to be able to reinitiate the same business or administrative process. Thus, in this case the downloaded data container serves as a pattern or blank from which essentially as many instances as desired can be generated.

Nevertheless, the data container preferably has modules that, after each opening of the data container by the first process participant, automatically bring about a check for up-to-date status by means of the transmission of a corresponding query to the at least one server device, wherein, in the event that a newer version of the data container is present on the server device, the modules preferably also cause the downloading of this newer version of the data container from the server device. Thus, after each opening of the data container by the first process participant, the up-to-date status of the data container is automatically checked by the modules with which the data container is designed, through a corresponding query, in particular a web service query, to the server device, wherein, in the event that a newer version of the data container is present on the server device, this new version is also preferably automatically downloaded from the server device through the communication network to the first data processing device. This check of up-to-date status also contributes to legal conformity, since the use of invalid data containers is avoided.

According to an alternative embodiment, however, the instantiation of a data container and the initialization of the data container instance with a unique identifier is already brought about by appropriate modules, in particular program codes, of the server device of the communication system in connection with the process of downloading to the data processing device of the first process participant. Such a downloaded data container instance cannot be used by the first process participant for repeated initiation of the same business or administrative process, however.

Preferably, provision is made in the communication system that the at least one data container provided by the at least one server device is predefined in such a manner that at least one trigger condition is associated with at least one process step, and that the data container is designed with modules that automatically bring about a monitoring of the occurrence of a trigger condition and, upon the occurrence of a trigger condition, bring about the transmission of a status message together with the unique identifier of the data container instance to the at least one server device or an additional server device. A trigger condition, which is to say a triggering event for the transmission of a status message, may be defined at the end of a process step, for example, when the transmission of the data container to the data processing device of the next process participant is automatically brought about. Thus, in this exemplary case the transmission of a status message to the at least one server device, or an additional server device, is also brought about at essentially the same time. Alternatively, or in addition, the opening of a data container can also be defined as a trigger condition, for example, so that the transmission of a status message is brought about after the data container has been opened by the additional process participant. Thus, the occurrence of a trigger condition is automatically monitored by the modules with which the data container is designed, and when a trigger condition occurs, a status message together with the unique identifier of the data container instance is automatically transmitted to the at least one server device or an additional server device.

It is preferred in the communication system for the at least one data container provided by the at least one server device to be designed with modules that, prior to the transmission of the data container instance to the additional data processing device of the process participant responsible for the additional process step, bring about the generation of a copy of the data container instance, including the process data hitherto acquired and stored, and the storage of this copy on the data processing device of the process participant responsible for the completed process step. Accordingly, a copy of the data container instance, including the process data hitherto acquired and stored, is automatically generated and stored on the data processing device of the process participant responsible for the completed process step prior to the transmission of the data container instance to the additional data processing device by the means with which the data container is designed. Consequently, a process participant can still reconstruct, even at a later time, which data he had transmitted onward.

In useful fashion, the at least one or an additional server device of the communication system is designed to store the status message and unique identifier of a data container instance transmitted to it in each case, as well as to transmit to the data processing device of a querying process participant, in response to a corresponding query, in particular a web service query, at least the most recent status message stored for an identifier. This allows a process participant to learn the current status of the process sequence at a point in time after transmission of a data container instance to another process participant. To this end, a process participant can preferably use the retained copy of a data container instance that has been transmitted onward, as will be explained below.

According to another preferred embodiment of the communication system, the at least one server device is designed to provide at least one data container, which is predefined in such a manner that at least one process step has associated with it at least one directory service or the addressing data of at least one directory service, in which the addressing data of the process participant responsible for this process step are stored, wherein, furthermore, the at least one server device and/or at least one additional server device is configured to provide the at least one directory service, and wherein the data container is additionally designed with means that automatically bring about, prior to the transmission of the data container or data container instance to the additional data processing device, in response to specific process data, the ascertainment of the addressing data of the process participant responsible for the additional process step from the at least one directory service. In other words, prior to the transmission of the data container or data container instance to the additional data processing device, the means with which the data container is designed automatically ascertain from the at least one directory service, in response to specific process data, the addressing data of the process participant responsible for the additional process step.

The augmentation of the directory included in the data container with the at least one additional process step by at least one directory service, which is provided by the at least one server device, or an additional server device, provides the advantage, in particular, that a data container itself still retains its validity even when, for example, the addressing data of a process participant, or even the process participant responsible for a process step, has changed, as long as these data are not stored in the container's internal directory itself, but instead are stored with the directory service. In such cases, it is then unnecessary for an updated data container version to be provided or downloaded. Even when addressing data, or even responsibilities, change during the course of an ongoing business or administrative process, the data container instance will automatically be transmitted to the correct additional data processing device. Moreover, it is an advantageous capability that the data stored in the directory services can be maintained by the particular process participants or their organizations themselves, in particular when the process participants or their organizations themselves operate the particular server devices with the directory services. Only when a directory service changes would the provided data container need to be updated accordingly. This makes a tremendous contribution to the flexibility of the data container and of the process-dependent routing.

In preferred manner, the at least one server device of the communication system is designed to provide at least one data container, which is predefined in such a manner that at least one process step has associated with it the addressing data of at least one additional possible responsible process participant, together with a selection condition, wherein the data container is additionally designed with modules that automatically bring about, prior to the transmission of the data container or data container instance to the additional data processing device, in response to specific process data and by comparing these process data with the selection condition for the at least one additional possible responsible process participant, the ascertainment of the addressing data of the process participant actually responsible for the additional process step from the multiple possible responsible process participants. This means that, prior to the transmission of the data container or data container instance to the additional data processing device, the modules with which the data container is designed, in response to specific process data, automatically compare these process data with the selection condition for the at least one additional possible responsible process participant, and ascertain the addressing data of the process participant actually responsible for the additional process step from the multiple possible responsible process participants.

In addition to the previously described feature, that addressing data of process participants can be stored with a directory service, this feature just now described also contributes to the flexibility of the data container and of the process-dependent routing. Preferably, no selection condition or a default selection condition is associated with the addressing data of one of the possible responsible process participants for a process step, so that this process participant is identified as responsible by default if none of the other possible selection conditions is met. Thus it is possible for the agencies of multiple municipalities in a county, for example, to jointly provide their citizens with the same data container for an administrative process that proceeds in essentially the same way in all agencies. However, this data container is predefined in such a manner that each process step has associated with it the addressing data of multiple possible process participants, for example the cognizant officials of the particular municipal agency. It is only during the already initiated process sequence that the addressing data of the process participant actually responsible for the additional process step are ascertained on the basis of specific process data, such as an entered postal code for instance, and the data container instance is correspondingly transmitted to this participant. Other examples of specific process data that can be determinative are the name or birth date of a person.

In addition, provision is preferably made that the at least one server device of the communication system is designed to provide at least one data container that is predefined in such a manner that the same position in the process sequence is associated with the at least one additional process step and at least one more additional process step, so that at least one alternative process step is defined at least at this one position, wherein a selection condition is associated with the at least one alternative process step, and wherein the data container is additionally designed with modules that automatically bring about, prior to the transmission of the data container or data container instance to the additional data processing device, in response to specific process data and comparison of these process data with the selection condition for the at least one alternative process step, the ascertainment of the actual next process step and of the addressing data of the process participant responsible for this process step. Consequently, prior to the transmission of the data container or data container instance to the additional data processing device, in response to specific process data, these process data are automatically compared with the selection condition for the at least one alternative process step, and the actual next process step and the addressing data of the process participant responsible for this process step are automatically ascertained by the modules with which the data container is designed. Preferably, no selection condition or a default selection condition is associated with one of many process steps with the same associated position, so that this process step is ascertained by default as the next process step if none of the other possible selection conditions are met. It is a matter of course that this, too, contributes to the flexibility of the data container and of the process-dependent routing.

It is preferred in the communication system for the at least one data container provided by the at least one server device to be implemented with data fields that are defined in accordance with an XML-based markup language. Thus, for example, numerous XML-based, application-specific markup languages, such as XBau, XDomea, XFinanz, XJustiz, XMeld, XSozial, have been and are being developed as technical and semantic standards for various specialized procedures, such as public administrative procedures, in various countries. In Germany, for example, such standards are being developed within the framework of the standardization effort known as "XÖV-XML in public administration" ["XÖV-XML in der öffentlichen Verwaltung"]. The XÖV standards that have been adopted to date are accessible to everyone through the so-called XRepository, a central, web-based library for the provision of XÖV data models and schemas. Depending on the implementation, the data fields of a data container provided in accordance with the invention are defined by modules of such XML-based markup languages and/or also other XML-based markup languages. It is also possible that some data fields within a data container are defined in accordance with a first markup language and other data fields are defined in accordance with a second markup language. The use of standardized markup languages, and in particular XML-based markup languages, for defining the data fields simplifies the readout of data from the data fields and the filling-in of the data fields of a data container, even in heterogeneous system worlds. It is a matter of course that the aforementioned at least one and/or an additional directory service also preferably provides its data in structured form in accordance with an XML-based markup standard.

In useful fashion, in the communication system, the at least one data container provided by the at least one server device includes at least one data field that is provided for at least one digital document. This allows a process participant to transmit a digital document, such as an image file that contains a scanned photocopy of an identity card or other document, together with the data container or within the data container or data container instance, so to speak as an attachment, to one or even more additional process participants.

It is also advantageous if, according to another preferred embodiment of the communication system, the at least one server device is designed to provide at least one data container that is predefined in such a manner that at least one data field that is mandatory for the responsible process participant to fill out is designated for at least one process step, wherein the data container is additionally designed with modules that, prior to the transmission of the data container or data container instance to the additional data processing device, automatically bring about the checking of each designated data field that is mandatory for the particular process participant to fill out, and only cause the transmission of the data container or data container instance to the additional data processing device once it has been determined that each designated data field has been filled in. In other words, prior to the transmission of the data container or data container instance to the additional data processing device, the modules with which the data container is designed automatically check each designated data field that is mandatory for the particular process participant to fill out, and only transmit the data container or data container instance to the additional data processing device once it has been determined that each designated data field has been filled in. In this way it is ensured that all process data are directly available that are absolutely necessary for carrying out an additional process step or multiple additional process steps. This can, firstly, contribute to legal conformity, and secondly, it avoids any requests for further information that would delay the process sequence.

Preferably, the at least one server device of the communication system is designed to provide at least one data container that is predefined in such a manner that at least one data field, for which a read and/or write option exists for the responsible process participant, is designated for at least one process step, wherein the data container is additionally designed with modules that, after the data container or data container instance has been opened by a process participant, automatically cause the granting only of read and/or write access to a particular data field for the relevant process participant. Thus, after the data container or data container instance has been opened by a process participant with the aid of the modules with which the data container is designed, read and/or write access for the relevant process participant is granted to only a particular data field. This provides data protection and data security, since it is possible to specify, for each process step, the data fields of a data container to which a particular process participant is to receive read or write access. In a useful manner, these are precisely only the data fields that the relevant process participant requires for carrying out the process step for which he is responsible, so that he can read process data only from specific data fields and/or can enter process data into only these data fields.

It is preferred for the at least one server device of the communication system to be designed to provide at least one data container that is predefined such that at least some of the data fields of the data container are, or can be, presented in a form-like arrangement when the data container or data container instance is opened on a data processing device. The data container is, for example, a PDF file, in particular in PDF version 1.7 pursuant to the public ISO 32000 standard, which is provided by the at least one server device of the inventive communication system. In addition to the aforementioned program code, which is in particular JavaScript code, the provided PDF file also includes a number of data fields and a layout description for at least one form page on which at least some of the data fields are arranged. When the PDF file is opened on the data processing device of a process participant, the at least one form page can be displayed on its display device so that the process participant can view or read the at least one form page with the data fields arranged thereon, but can also enter data into individual data fields with the aid of the input devices of the data processing device, such as a keyboard and mouse. The form-like presentation of data fields is of course particularly advantageous when the process participant is a person. However, if the process participant is only a machine, which is to say that a process step can be performed fully automatically by a data processing device, form-like presentation of the data fields is generally not necessary for readout and/or fill-in of data fields; instead, the definition or markup of the data fields, which is preferably XML-based, is sufficient for this purpose.

Furthermore, provision is preferably made in the communication system that the at least one server device is configured to provide at least one data container that is predefined such that for at least one process step at least one data field is designated that is to be displayed or is not to be displayed to the responsible process participant, and/or such that for at least one process step at least one data field is designated that has associated with it a display condition as a function of which the data field is to be displayed or is not to be displayed, and wherein the data container is further designed with modules that, after the data container or data container instance has been opened by a process participant, automatically cause a particular data field to be displayed or hidden as a function of the particular process step and/or process participant and/or in response to specific process data and comparison of these process data with the display condition. Accordingly, after the data container or data container instance has been opened by a process participant, as a function of the particular process step and/or process participant and/or in response to specific process data, these process data are automatically compared with the display condition by the modules with which the data container is provided, and a particular data field is displayed or not displayed. This serves, firstly, to further improve user friendliness for human process participants, since the forms presented only show the data fields relevant to the process participant, and hence remain clear. For example, in an application form, additional data fields for the personal data of a person having parental authority are only displayed after the status of the applicant as a minor is detected based on the entered birth date. In this example case, it is also possible at the same time to determine for the additionally displayed data fields that filling them in is mandatory. Secondly, however, the hiding of data fields also contributes to data protection, since, for example, those fields to which the relevant process participant has no read and/or write access in any case are not displayed in the first place.

In advantageous manner, the at least one server device of the communication system is configured to provide at least one data container that is predefined such that at least some data fields of the data container have field labels in one or more languages associated with them, wherein the language to be displayed is selectable. This means that the data container or data container instance is displayed in the particular selected language after opening on the data processing device. This also contributes to user friendliness for human process participants, since the process participant can select the language in which field labels are to be displayed in the forms presented. Thus, a data container is also usable for business or administrative process that cross national borders.

Furthermore, provision is preferably made in the communication system that the at least one server device is designed to provide at least one data container that is designed with modules that, after a copy of a data container instance has been opened, can bring about the transmission of a status query, together with the unique identifier of the data container instance, preferably by means of a web service request, to the at least one server device, or another server device, and that can also bring about the presentation of the status information received in response from the server device on the display unit of the data processing device of the process participant. This means that, after a copy of a data container instance has been opened, the modules with which the data container is designed can transmit a status query together with the unique identifier of the data container instance to the at least one server device, or another server device, preferably by means of a web service request, and that the status information received from the server device in response is then automatically presented on the display unit of the data processing device of the process participant. Thus, process-dependent status information that allows monitoring of the process sequence is available to every process participant.

It is preferred for the at least one server device of the communication system to be designed to provide at least one data container that is predefined such that a keycode is also associated with at least one process step together with the addressing data of a responsible process participant, wherein the data container is further designed with modules which, prior to transmission of the data container or data container instance to the additional data processing device, automatically bring about checking for the presence of a keycode associated with the process participant responsible for the additional process step, and if a keycode is present, bring about the encryption of at least one data field using the keycode. In this regard, the data container is further provided with modules which, after the data container or data container instance has been opened by a process participant, automatically bring about the decryption of encrypted process data insofar as the relevant process participant has entered the matching keycode. Accordingly, therefore, the modules with which the data container is designed automatically check the presence of a keycode associated with a process participant responsible for the additional process step before transmission of the data container or data container instance to the additional data processing device, and if a keycode is present, the process data of at least one data field are encrypted using the keycode. Furthermore, after the data container or data container instance has been opened by a process participant, the encrypted process data of at least one data field are decrypted again insofar as the relevant process participant has entered the matching keycode. It is self-evident that this provides for data protection or data security, since neither read nor write access to encrypted data fields is possible without the matching keycode for decryption. Naturally, it is also possible that a keycode associated with the addressing data of process participants, in particular the public key of a key pair of an asymmetric cryptosystem, can also be stored in addition to said addressing data, preferably in the aforementioned at least one directory service, or an additional directory service.

Moreover, provision is preferably made in the communication system that the at least one server device is configured to provide at least one data container that is designed with modules that, prior to the transmission of the data container or data container instance to the additional data processing device, can automatically bring about the electronic signing of at least the data fields for which the relevant process participant had read and write access, insofar as the process participant has provided an appropriate signature keycode for a qualified or advanced electronic signature. In this design, the data container is also designed with modules that can automatically bring about the verification of the electronic signature after the data container or data container instance has been opened by a process participant. This means that the modules with which the data container is designed can cause at least the data fields for which the relevant process participant had read and write access to automatically be signed electronically prior to the transmission of the data container or data container instance to the additional data processing device, insofar as the process participant has provided an appropriate signature keycode for this purpose, and that after the data container or data container instance has been opened by a process participant, the electronic signature can automatically be verified. Consequently, the integrity and authenticity of the process data are also verifiable and the identification or authentication of the signing process participant is possible, thereby ensuring legal certainty.

It must also be noted that preferably the at least one server device of the inventive communication system does not store any process data that have been entered in the data fields of a data container by the process participants, except for the data required for process-dependent routing (see directory services) and the process-dependent status information.

However, provision is made in especially preferred manner that at least one server device in the communication system is designed to archive data containers or data container instances from process sequences that have already been completed.

As already mentioned above, a service for the process-oriented acquisition, storage, transmission, and provision of data by means of an intelligent data container is thus provided by the at least one server device of the communication system. By means of this intelligent data container, business or administrative processes that transcend organizational boundaries can be performed significantly more simply and more efficiently. As a result, organizations that use these services to carry out their processes are spared the need to acquire and operate their own process control system.

For this reason, the capability is also provided for a fee to be paid to the service provider who operates the at least one server device in the inventive communication system for the use of the service for carrying out business or administrative processes. This may be a transaction fee that is charged for each fetch of a unique identifier for a data container instance, for example, or for any other desired status message originating from a data container instance.

Figure 1:
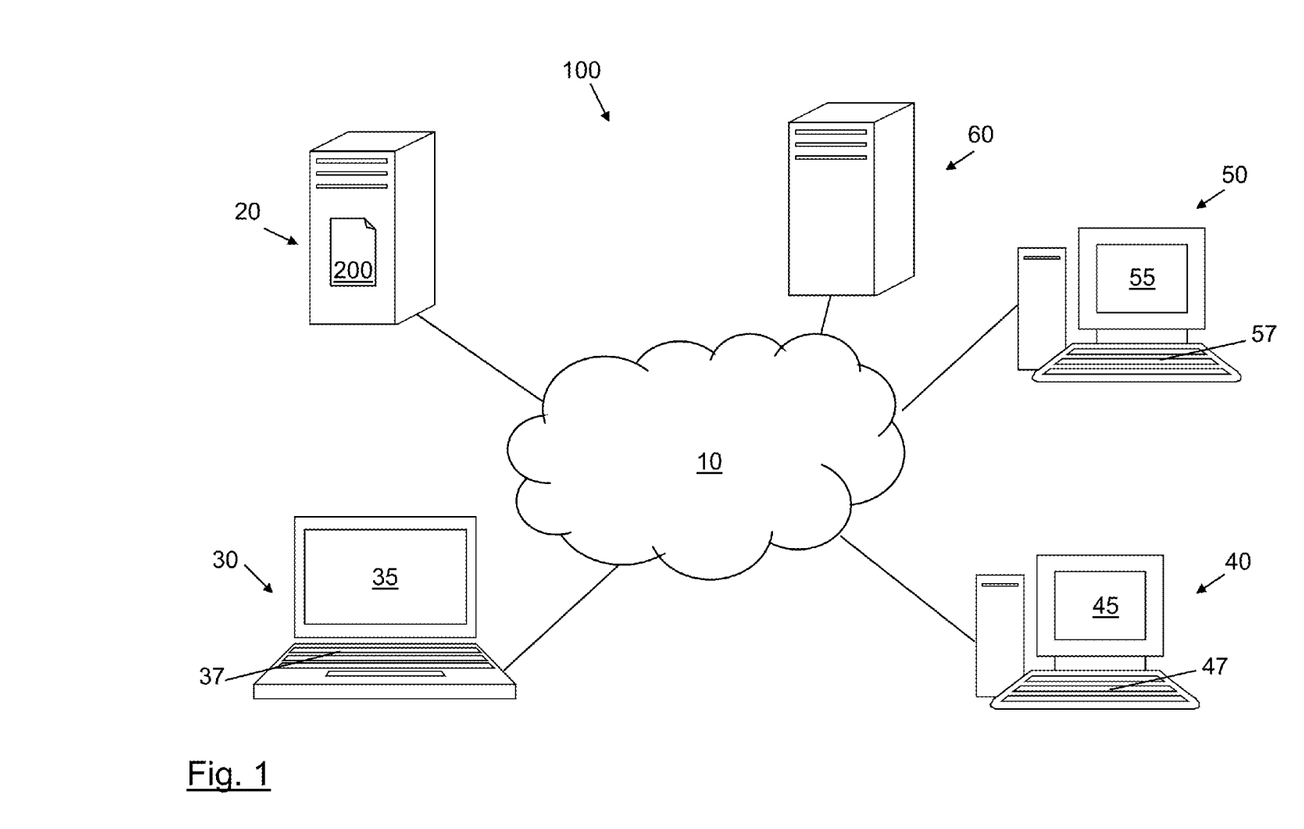
FIG. 1 depicts a schematic diagram of a communication system according to one embodiment of the invention, comprising two server devices and three data processing devices that are connected to one another through a communication network.
Figure 2:
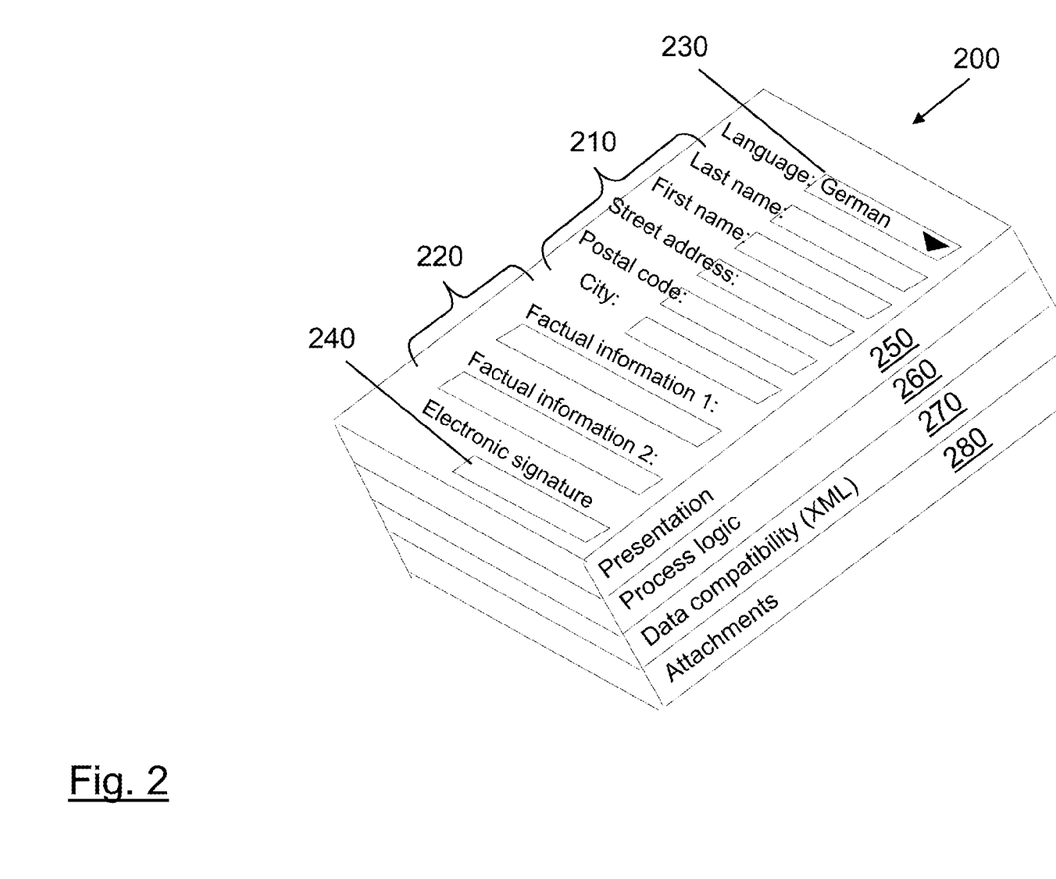
FIG. 2 depicts a schematic diagram of a data container with a number of data fields according to another embodiment of the invention.

With explicit reference to the preceding evaluation of the invention, FIG. 1 schematically shows an exemplary embodiment of the inventive communication system, hereinafter labeled 100 overall, and FIG. 2 schematically shows an exemplary representation of a data container according to the invention, hereinafter identified by 200, with a number of data fields.

In accordance with the embodiment shown in FIG. 1, the communication system 100 includes two server devices 20 and 60, and three data processing devices 30, 40, and 50, all of which are connected to one another through the communication network 10.

The data processing device 30 is a laptop computer with a display device 35 and a keyboard as the input device 37. A computer mouse or a touchpad is advantageously also present as an additional input device, but is not shown in FIG. 1. The additional data processing devices 40 and 50 are, for example, conventional personal computers or workstations or terminal computers, etc. However, each of the data processing devices 40 and 50 has at least one display device 45 or 55, respectively, and an input device 47 or 57.

The server device 20 is designed to provide at least the data container 200, which is adapted for an administrative process and can be downloaded through the communication network 10 to the data processing device 30 of the first process participant.

The server device 60 is designed to provide a directory service in which are stored addressing data and, if applicable, also public keys.

The communication network 10, which is shown in very simplified form, can of course also include more partial networks and/or subnetworks.

FIG. 2 schematically shows the data container 200 from FIG. 1, with a number of exemplary data fields.

The data container 200, which is adapted for an administrative process, includes predefined data fields 210 for generally applicable data such as name, street address, city, and postal code of the applicant, which is to say of the first process participant. In addition, the data container 200 includes data fields 220 for process-specific data. Consequently, the data fields 220 are labeled by way of example as factual information 1 and factual information 2. Of course, the data container 200 may also include still more data fields, although these are not visible in FIG. 2 for reasons of simple and clear illustration.

FIG. 2 also shows a form-like arrangement of the data fields, as they would be presented to a process participant on the display device of his data processing device, for example. For this form view, a suitable layout description is specially stored in the data container 200. The layer 250 is indicated in FIG. 2 for this and any additional layout descriptions that may be present. However, hidden behind the data fields arranged and presented in a form-like manner are data fields defined by means of at least one XML-based markup language, which also permit automatic readout or fill-in. This is indicated in FIG. 2 by the layer 270.

The data container 200 shown in FIG. 2 has a number of data fields, namely those for the generally applicable process data, which are defined in accordance with a first XML-based markup language, as well as a number of data fields that are provided for process-specific data and are defined in accordance with another XML-based markup language.

The additional layer 260 symbolizes the process logic of the data container 200. This process logic includes, firstly, a directory for the process steps belonging to the administrative process, along with the addressing data of the process participants responsible in each case. Also included herein are computer programs which bring about the automatic evaluation of this directory and the automatic transmission of the data container to the process participant responsible for the next step, among other things.

Also located on the form-like arrangement of data fields shown in FIG. 2 is a selection menu or selection field 230, which allows selection of a language for the field labels of the data fields. As can be seen in FIG. 2, German is selected there as the language. In addition to German, English and Italian-language field labels are also associated with the data fields of the data container 200, for example, which could be selected as alternatives through the selection menu 230. Consequently, the data container 200 shown in FIG. 2 includes modules that bring about the display of the field labels in the particular language selected.

The additional field 240 is used to hold the electronic signature. Furthermore, the data container 200 also includes additional data fields, as well as additional layout descriptions for the form-like presentation of these additional data fields. Included among these additional data fields is, for example, one that can hold entire files, in particular image files. This capability, namely of being able to also transmit additional, complete files or documents within the data container, is indicated by the layer 280 in FIG. 2, however.

An exemplary sequence of the first process steps of the administrative process, for which the data container 200 is adapted, will be explained below with reference to both FIGS. 1 and 2.

It is assumed in this context that the data processing device 30 is associated with the first process participant, while the data processing device 40 is associated with a second process participant, and the data processing device 50 with a third process participant.

The first process participant is a citizen who initiates the administrative process with the submission of an application, while the second and third process participants are each officials at a municipal agency, these being two different agencies.

The citizen, who looks for the appropriate downloadable application form on the web pages of his municipal agency, finds a web link that takes him to the data container 200, which is provided by the server device 20. The citizen downloads the data container 200 to his data processing device 30, where he opens the data container 200.

The opening of the data container 200 has the result that the program code contained in the data container is executed by the data processing device 30. In the present case, the program code is JavaScript code, which can be executed system-independently or platform-independently on essentially any data processing device.

The executed program code first checks the up-to-date status of the data container 200 in that a corresponding web service query is transmitted to the server device 20. The web service address to use in this process is stored in the data container. In the event that a newer version of the data container is already present on the server device 20, this could be or would have to be downloaded by the server device 20 to the data processing device 30, because—in a useful manner—no additional process can be initiated with a data container version that is no longer valid. Since the data container 200 existing on the data processing device 30 in the present example was downloaded just a short time ago, the check produces the result that this is the current or valid version.

The instantiation of the data container takes place as an additional step; this means that an image, as it were, of the data container 200 is produced, said data container having thus served as a pattern and, provided it is valid, can also serve again as a pattern for further instantiations as well. A unique identifier for the generated data container instance is fetched from the server device 20 by means of a corresponding web service query. The web service address to be used here is stored in the data container.

In addition, the server device 20, triggered by the query for a unique identifier, charges a transaction fee to the agency with the associated data processing device 40, since it is the agency's administrative process that has now been initiated and can be carried out with the uniquely identified data container instance.

Located on the data processing device 30 of the citizen are now, firstly, the originally downloaded data container 200, and secondly, an instance generated by the same. The citizen can work further with the data container instance, which is to say he fills out the data fields 210 and 220 displayed in the manner of a form on the display device 35, which have German field labels on account of the selected language. In addition to the data fields shown in FIG. 2, yet another additional data field is displayed to the first process participant, into which he can insert an image file with his passport photo in order to transmit it in the data container instance to the next process participant, which is to say to the municipal agency, together with the process data entered in the other data fields.

While the data container instance does include yet more data fields not shown in FIG. 2, these are not displayed to the citizen as the first process participant, since he is not supposed to fill them out. This is stored in the data container instance as association between process step, process participant, data fields and the attribute "display" or "hide" (i.e., "do not display"). In addition, with regard to the first process participant, the data fields with the associated attribute "display" also have associated with them the two additional attributes "read and write" and "mandatory." This means that the first process participant, which is to say the citizen, has read and write access to the data fields he is to fill out, and that the data container instance cannot be transmitted to the second process participant until all required, mandatory fields have in fact been filled out. To this end, the data container 200, and thus also the data container instance, includes the relevant modules that automatically bring about the display or hiding of a particular data field as a function of the particular process step and/or process participant and/or in response to specific process data, or that automatically grant only the read and/or write access to a particular data field that is intended for the applicable process participant, or that, prior to transmitting the data container instance to the additional data processing device 40, automatically check each data field that is mandatory for the first process participant to fill out, and only permit transmission of the data container instance once it has been determined that it is filled out.

Once the first process participant has finished filling in the data fields, the data fields he has filled in are electronically signed by the action of the modules of the data container instance after the first process participant has provided his signature keycode.

As a receipt for the citizen's documents, as well as to provide the capability to check the status of the administrative process at a later time, the modules of the data container instance further cause a copy of the data container instance to be created, including the data entered in the data fields and the photo included as an attachment, and stored on the data processing device 30.

As additional steps that are brought about by appropriate modules of the data container instance, the following take place: checking for the presence of an additional process step in the sequence of the administrative process, and ascertainment of the next process step and of the addressing data of the process participant responsible for this process step, and if applicable of that participant's public keycode, by evaluation of the directory with the at least one additional process step contained in the data container instance. In the present example, this directory contains still more additional process steps, each of which is assigned a position in the sequence of the process steps, as well as the addressing data for a directory service in which are stored the addressing data for the process participant responsible for each specific process step and, if applicable, that participant's public keycode.

This directory service is provided by the server device 60, which is operated and maintained by the two agencies involved in the administrative process described. After ascertainment of the e-mail address and public keycode of the cognizant official at the agency having the data processing system 40, who is the process participant responsible for the second process step, additional modules of the data container instance bring about the encryption of the process data entered by the first process participant using the keycode ascertained from the directory service.

Finally, the transmission of the data container instance, including the process data hitherto acquired and stored, to the additional data processing device 40 of the process participant responsible for the additional process step through the communication network 10, is accomplished using the ascertained e-mail address.

Together with the transmission of the data container instance, a corresponding status message is also transmitted to the server device 20 together with the unique identifier of the data container instance, since the transmission of the data container instance to the next process participant is stored in the data container instance as the trigger condition for the first process step.

The second process participant receives the transmitted data container instance on his data processing device 40 by e-mail. After the data container instance has been opened on the data processing device 40, the second process participant is automatically prompted to enter the matching keycode for decryption of the encrypted data fields of the data container instance through action of the executed program code. As long as the correct keycode has been entered, the decryption of the data fields and then the verification of the electronic signature are automatically accomplished by corresponding modules of the data container instance.

Data fields are then displayed in a form-like arrangement on the display 45 of the data processing device 40, wherein not all data fields that were filled in by the first process participant during the first process step are displayed to the second process participant. Thus, the data field "factual information 2" remains hidden from the second process participant, since this is stored in the data container instance for this data field as an association between the second process step, the responsible process participant, and the attribute "hidden." The process data of the data field "factual information 2" are not needed during this second process step, however.

Thanks to the XML-based definition of the data fields, the rest of the process data can be automatically imported into the data processing device 40, so that the second process step can be carried out with the aid of the data processing device 40 using the process data from the transmitted data container instance.

At the end of the second process step, suitable modules of the data container instance automatically bring about checking for the presence of an additional process step in the sequence of the administrative process and the ascertainment of the next process step and of the addressing data of the process participant responsible for this additional process step, by evaluation of the directory with the at least one additional process step contained in the data container instance. In the directory, the additional process step, which is assigned the position 3 in the process sequence, additionally has associated with it the addressing data for the directory service provided on the server device 60. In this directory service, however, three sets of alternative address data for possible responsible process participants are stored, each with an associated selection condition, wherein the selection conditions define different values with regard to the process data in the data field "Factual information 2." Hence, the addressing data for the process participant actually responsible for the next process step is ascertained in response to the process data in the said data field and comparison of these process data with the respective selection conditions for the three stored sets of addressing data.

Here, addressing data for a web service is stored in the directory service for the process participant ascertained to be responsible, since in this case the responsible process participant is an "automatic agent," which is to say a machine, that independently performs the activities belonging to the third process step.

By using the ascertained web service address, the data container instance, including the process data hitherto acquired and stored, is automatically transmitted to the additional data processing device 50 of the "automatic agent" responsible for the additional process step through the communication network 10, and in particular through a secure connection such as an HTTPS connection.

Together with the transmission of the data container instance, another status message is again automatically transmitted to the server device 20 along with the unique identifier of the data container instance, since the transmission of the data container instance to the next process participant is stored in the data container instance as the trigger condition for the second process step as well.

Once the data container instance has arrived at the data processing device 50 through the secure connection in the communication network 10, the data container instance can be automatically opened there by the "automatic agent" as the third process participant, and thanks to the XML-based definition of the data fields, can be automatically imported into the data processing device 50 for further processing.

After the opening of the data container instance during the third process step, another status message is automatically transmitted to the server device 20 together with the unique identifier of the data container instance, since the opening of the data container instance is stored in the data container instance as a trigger condition for the third process step.

In the meantime, the citizen, who, as the first process participant, had initiated the administrative process in progress, would like to learn the current status of the process.

To this end, he uses the retained copy of the data container instance and opens it on his data processing device 30. Firstly, this copy also has the unique identifier obtained from the server device 10 in conjunction with the instantiation. Secondly, the data container 200 is provided with modules which, after opening of a copy of a data container instance, can bring about the transmission of a status query, together with the unique identifier of the data container instance, by modules of a web service request, to the server device 20 and which can also bring about the presentation of the status information received from the server device 20 in response to the status query on the display unit 35 of the data processing device 30 of the process participant.

For its part, the server device 20 is accordingly designed to store each status message and unique identifier of a data container instance transmitted to it during a process sequence, as well as to transmit at least the most recent status message stored for an identifier to the data processing device 30, 40, or 50 of a querying process participant in response to a corresponding query.

In this simple way, the citizen could learn how far the processing of the administrative process he initiated has progressed. In other words, he now knows that the third process step has already been carried out.

Even though no data processing device is shown for the fourth process step in FIG. 2, it must still be mentioned that, in the data container instance in the directory with the at least one additional process step, a total of two process steps are associated with the fourth position in the process sequence. In this context, a certain selection condition with regard to the process data contained in a process field of the data container is associated with one possible process step, while the other process step does not have an associated selection condition, and hence is selected by default if the selection condition for the alternative process step does not apply. Consequently, alternative process steps, and hence alternative actions to be carried out, are provided in this fourth position in the process sequence as a function of specific process data. Of course, different process participants responsible for the alternative process steps may also be associated with these steps.

With regard to the different web services mentioned, it must be noted that, with the exception of the "automatic agent," they are provided by the at least one server device 20 and/or an additional server device 60 of the communication system 100, each of which are equipped with suitably appropriate modules.

In summary, it is thus possible to state that the present invention provides a solution, such as in the form of the communication system 100 for example, for the process-oriented acquisition, storage, transmission, and provision of data, in particular across the boundaries of multiple organizations and their insular solutions. In this context, the "process-oriented" characteristic applies directly to multiple features of the inventive solution, including preferred features.

In this way, a data container provided by the at least one server device is adapted to one process in each case, and includes, firstly, a directory with the process steps belonging to the process and the addressing data of the process participants responsible for the individual process steps. Secondly, this data container also includes a number of data fields for the structured and, in especially preferred fashion, also the standardized acquisition, storage, and provision of data required during the process.

Moreover, the process steps in the directory included in the data container have associated with them positions in the process sequence that permit reliable execution of even long process sequences.

Each data container instance is uniquely identifiable and thus can be tracked and monitored throughout an entire process sequence.

Finally, the data container includes a plurality of different modules that, based on the particular information stored in an internal directory of the data container or in an external directory service, can bring about the control of the process, and in particular the control of the data acquisition, data transmission, and data provision, by modules of the data container, even across organizational boundaries.

During the data acquisition and data provision, active use is made of access rights, encryption, signing, and/or dynamic adaptation of form interfaces through the showing and hiding of data fields.

The actual next process step and the actual process participant responsible for performing this step can be determined at the time of execution from a number of alternative process steps and/or responsibilities, in particular as a function of current process data.

In this way, high overall flexibility can be achieved and a data container provided by a server device of the inventive communication system can be used for multiple variants of a process.

While the invention has been described with reference to particular embodiments thereof, it will be understood by those having ordinary skill in the art that various changes may be made therein without departing from the scope and spirit of the invention. Further, the present invention is not limited to the embodiments described herein; reference should be made to the appended claims.

What is claimed is:

1. A communication system for process-oriented acquisition, storage, transmission, and provision of data, the communication system comprising:
   at least one server device, the at least one server device being configured to provide a predefined data container for at least one process, and
   a plurality of data processing devices connected with the at least one server device through a communication network,
   wherein at least one of the plurality of data processing devices is configured to download the data container to perform a first process step of the at least one process and to provide at least a one-time initiation of the at least one process,
   wherein the data container comprises a number of data fields for acquisition, storage, and provision of process data of the at least one process, and a directory with at least one additional process step of the at least one process, the at least one additional process step being associated with addressing data of a respective responsible process participant responsible for the at least one additional process step, and
   wherein the data container comprises at least a module configured, at the end of each step of the least one process, to:
      automatically check, by evaluating the directory, for a presence of the at least one additional process step in the at least one process,
      when the at least one additional process step is present in the at least one process, determine the addressing data of the respective process participant responsible for the at least one additional process step, and
      transmit the data container to an additional data processing device, of the respective process participant responsible for the at least one additional process step.

2. The communication system according to claim 1,
   wherein each of the first and the at least one additional process step is assigned a position in a sequence of the at least one process, and
   wherein the at least one module is configured to transmit the data container to the additional data processing device of the process participant responsible for the at least one additional process step in a next position in the sequence of the at least one process.

3. The communication system according to claim 1,
   wherein after a process participant has opened the data container for the initiated at least one process, the data container is configured to generate a new instance of the data container, and fetch a unique identifier for the new instance of the data container from the at least one server device, and
   wherein at the end of the process step, the at least one module is configured to transmit to another data processing device the generated data container instance, including the process data acquired and stored thereon, and
   wherein the data container downloaded from the server device remains on the at least one data processing device of the respective process participant, and is reopened to reinitiate the at least one process.

4. The communication system according to claim 3,
   wherein at least one trigger condition is associated with the at least one process step, and
   wherein the at least one module is configured to automatically monitor an occurrence of the least one trigger condition and, upon the occurrence of the at least one trigger condition, transmit a status message with the unique identifier of the data container instance to the at least one server device or an additional server device.

5. The communication system according to claim 1,
   wherein the at least one module is configured to generate, prior to the transmission of the data container to the additional data processing device of the respective process participant responsible for the at least one additional process step, a copy of an instance of the data container, and store the copy on the data processing device of the process participant responsible for a completed respective process step.

6. The communication system according claim 1,
   wherein the at least one server device or an additional server device is configured to store the status message and an unique identifier of an instance of the data container transmitted thereto, and to transmit to the at least one data processing device of a querying process participant, in response to a corresponding query, at least the most recent status message stored for the identifier.

7. The communication system according claim 1,
   wherein at least one step of the at least one process is associated with at least one directory service, and the addressing data of the respective responsible process participant is stored in the at least one directory service,
   wherein the at least one server device is configured to provide the at least one directory service, and
   wherein the at least one module of the data container is configured to automatically determine the addressing data of the respective responsible process participant responsible for the additional process step from the at least one directory service, prior to the transmission of one of the data container and a data container instance to the additional data processing device, in response to specific process data.

8. The communication system according to claim 1, wherein the process is least one of an administrative and business process.

9. The communication system according to claim 1, wherein the data fields of the data container are defined in accordance with an XML-based markup language.

10. The communication system according to claim 1, wherein at least one data field of the data container is provided for at least one digital document, and the at least one digital document is transmitted as an attachment together with the data container and an instance of the data container.

11. The communication system according to claim 1, wherein at least one data field of the data container is required for the responsible process participant and the at least one data field is designated for at least one process step, and
wherein the at least one module of the data container is configured to automatically check, prior to the transmission of the data container or a transmission of an instance of the data container to the additional data processing device, each designated data field that is required for the respective responsible process participant, and transmit the data container or the instance of the data container to the additional data processing device when each designated data field has been filled in.

12. The communication system according to claim 1, wherein at least one data field of the data container is designated for at least one process step and at least one of a read and write access is present for the at least one process step for the respective responsible process participant, and
wherein the at least one module of the data container is configured to automatically grant the at least one of the read and write access designated for the at least one data field for the respective responsible process participant after one of the data container and data container instance has been opened.

13. The communication system according to claim 12, wherein at least one of the data fields of the data container is presented in a form like arrangement.

14. The communication system according claim 12, wherein the at least one module of the data container is configured to automatically, after the data container or an instance of the data container has been opened by a process participant, at least one of display and hide a particular data field of the data container as a function of at least one of the process step, the process participant, and the process data.

15. The communication system according to 12, wherein at least one data field of the data container is associated with field labels in one or more languages, and a language to be displayed is selectable.

16. The communication system according claim 1, wherein a keycode is associated with the at least one process step and with the addressing data of the respective responsible process participant, and
wherein the at least one module of the data container is configured to:
automatically check, prior to the transmission of the data container or a transmission of an instance of the data container to the additional data processing device, for a presence of a keycode associated with the process participant responsible for the at least one additional process step; and, if the keycode is present, to encrypt the process data of the at least one data field using the keycode, and
automatically, after the data container or the instance of the data container has been opened, decrypt the encrypted process data when the process participant enters a matching keycode.

17. The communication system according to claim 8, wherein at least one step of the at least one process is associated with the addressing data of at least one additional possible respective responsible process participant, and
wherein the at least one module of the data container is configured to automatically determine, prior to the transmission of the data container to the additional data processing device, in response to specific process data, the addressing data of the respective process participant actually responsible for the additional process step from a plurality of possible respective responsible process participants.

18. A method for process-oriented acquisition, storage, transmission, and provision of data, the method comprising:
providing, by at least one server device, a predefined data container for at least one process, a plurality of data processing devices being connected with the at least one server device through a communication network, the data container comprising a number of data fields for acquisition, storage, and provision of process data of the at least one process, and a directory with at least one additional process step of the at least one process, the at least one additional process step being associated with addressing data of a respective responsible process participant responsible for the at least one additional process step;
making the data container available for download by at least one of the plurality of data processing devices to enable the least one of the plurality of data processing devices to perform a first process step of the at least one process and to provide at least a one-time initiation of the at least one process; and
at the end of each step of the at least one process, by at least one module of the data container:
automatically checking, by evaluating the directory, for a presence of the at least one additional process step in the at least one process,
determining, when the at least one additional process step is present in the at least one process, the addressing data of the respective process participant responsible for the at least one additional process step, and
transmitting the data container to an additional data processing device of the respective process participant responsible for the at least one additional process step.

19. The method according to claim 18, wherein each of the first and the at least one additional process step is assigned a position in a sequence of the at least one process, and
wherein the data container is transmitted to the additional data processing device of the process participant responsible for the at least one additional process step in a next position in the sequence of the at least one process.

20. The method according to claim 18, wherein after a process participant has opened the data container for the initiated at least one process, the data container generates a new instance of the data container and fetches a unique identifier for the new instance of the data container from the at least one server device, and
wherein at the end of the process step, the at least one module transmits to another data processing device the generated data container instance, including the process data acquired and stored thereon, and
wherein the data container downloaded from the server device remains on the at least one data processing device of the respective process participant, and is reopened to reinitiate the at least one process.

* * * * *